US008658041B2

(12) United States Patent
Koros (10) Patent No.: US 8,658,041 B2
(45) Date of Patent: *Feb. 25, 2014

(54) SORBENT FIBER COMPOSITIONS AND METHODS OF USING THE SAME (75) Inventor: William J. Koros, Atlanta, GA (US)

(73) Assignee: Georgia Tech Research Corporation, Atlanta, GA (US)

(*) Notice: Subject to any disclaimer, the term of this patent is extended or adjusted under 35 U.S.C. 154(b) by 807 days.

This patent is subject to a terminal disclaimer.

(21) Appl. No.: 12/666,534

(22) PCT Filed: Jun. 27, 2008

(86) PCT No.: PCT/US2008/068596
§ 371 (c)(1),
(2), (4) Date: Oct. 1, 2010

(87) PCT Pub. No.: WO2009/003174
PCT Pub. Date: Dec. 31, 2008

(65) Prior Publication Data
US 2011/0011803 A1   Jan. 20, 2011

Related U.S. Application Data (60) Provisional application No. 60/946,475, filed on Jun. 27, 2007.

(51) Int. Cl.
B01D 15/00 (2006.01)
(52) U.S. Cl.
USPC ......... 210/660; 210/670; 210/502.1; 210/509
(58) Field of Classification Search
USPC .................... 210/660, 670, 502.1–509
See application file for complete search history.

(56) References Cited

U.S. PATENT DOCUMENTS

| 870,395 | A | * | 11/1907 | Teese ........................ 119/14.16 |
| 3,925,041 | A | | 12/1975 | Patterson et al. |
| 4,010,308 | A | * | 3/1977 | Wiczer ........................ 428/372 |
| 4,354,859 | A | | 10/1982 | Keller, II et al. |
| 4,960,520 | A | | 10/1990 | Semmens |

(Continued)

FOREIGN PATENT DOCUMENTS

| EP | 0434219 | 2/1995 |
| WO | 2004024303 | 3/2004 |
| WO | 2009003171 | 12/2008 |
| WO | 2009003174 | 12/2008 |

OTHER PUBLICATIONS

International Search Report and Written Opinion dated Oct. 1, 2008 for related PCT Application No. PCT/US2008/068587.

(Continued)

Primary Examiner — Chester Barry
(74) Attorney, Agent, or Firm — Ryan A. Schneider; Troutman Sanders LLP (57) ABSTRACT The various embodiments of the present invention relate generally to sorbent fiber compositions. More particularly, various embodiments of the present invention are directed towards sorbent fibers for pressure swing and temperature swing adsorption processes. Various embodiments of the present invention comprise a sorbent composition, comprising a fiber comprising a plurality of tortuous pathways; and a sorbent material, wherein the sorbent material is in fluid communication with at least a portion of the plurality of tortuous pathways. Aspects of the present invention comprise compositions, devices and methods of using sorbent fiber compositions.

21 Claims, 3 Drawing Sheets

(56) References Cited

U.S. PATENT DOCUMENTS

| | | | |
|---|---|---|---|
| 5,139,668 | A | 8/1992 | Pan et al. |
| 5,143,312 | A | 9/1992 | Baurmeister |
| 5,200,248 | A * | 4/1993 | Thompson et al. ............ 428/131 |
| 5,281,208 | A * | 1/1994 | Thompson et al. ............ 604/378 |
| 5,288,304 | A | 2/1994 | Koros et al. |
| 5,448,963 | A * | 9/1995 | Gallington .................... 114/274 |
| 5,595,659 | A * | 1/1997 | Huang et al. ................. 210/502.1 |
| 5,820,659 | A | 10/1998 | Ekiner et al. |
| 5,837,087 | A * | 11/1998 | Ahr ............................... 156/250 |
| 6,284,206 | B1 | 9/2001 | Lesieur et al. |
| 6,395,956 | B1 * | 5/2002 | Glasgow et al. .............. 604/378 |
| 6,423,123 | B1 | 7/2002 | Rosenberg et al. |
| 6,645,271 | B2 | 11/2003 | Seguin et al. |
| 6,824,592 | B2 | 11/2004 | Monzyk et al. |
| 8,133,308 | B2 | 3/2012 | Lively et al. |
| 2003/0196549 | A1 * | 10/2003 | Rohrbach et al. .................. 95/90 |
| 2004/0217049 | A1 | 11/2004 | Bayer et al. |
| 2005/0121393 | A1 * | 6/2005 | Galbraith ..................... 210/670 |
| 2006/0049102 | A1 | 3/2006 | Miller et al. |
| 2007/0062870 | A1 | 3/2007 | Chen et al. |
| 2008/0011163 | A1 | 1/2008 | McClain |
| 2009/0025555 | A1 | 1/2009 | Lively et al. |
| 2010/0212853 | A1 * | 8/2010 | Klungness .................. 162/181.4 |
| 2010/0274209 | A1 * | 10/2010 | Roe et al. ...................... 604/378 |

OTHER PUBLICATIONS

Supplementary European Search Report dated Jul. 14, 2011 for related European Patent Application No. EP08772173.

Flank, William H., "Adsorption and Ion Exchange with Synthetic Zeolites: Principles and Practice: Based on a Symposium Sponsored by the Division of Industrial; Engineering Chemistry at the 180th Meeting of the American Chemical Society", ACS Symposium Series, vol. 135, Aug. 25-26, 1980, pp. 274-286.

Burchell, T.D. et al., "A Novel Process and Material for the Separation of Carbon Dioxide and Hydrogen Sulfide Gas Mixtures", Carbon, vol. 35, No. 9, 1997, Elsevier Science Ltd., pp. 1279-1294.

McKelvey, Scott A. et al., "A Guide to Establishing Hollow Fiber Macroscopic Properties for Membrane Applications", Journal of Membrane Science, vol. 124, 1997, pp. 223-232.

Koros, William J. et al., "Design Considerations for Measurement of Gas Sorption in Polymers by Pressure Decay", Journal of Polymer Science, vol. 14, 1976, pp. 1903-1907.

International Search Report and Written Opinion dated Oct. 1, 2008 issued by the United States Patent and Trademark Office for corresponding PCT Application No. PCT/US2008/068596.

* cited by examiner

SORBENT FIBER COMPOSITIONS AND METHODS OF USING THE SAME

RELATED APPLICATIONS

This application, filed under 35 U.S.C. §371, is a U.S. National Stage Application of International Patent Application Serial Number PCT/US2008/068596, filed 27 Jun. 2008, which claims, under 35 U.S.C. §119(e), the benefit of U.S. Provisional Patent Application Ser. No. 60/946,475, filed 27 Jun. 2007, the entire contents and substance of which are hereby incorporated by reference as if fully set forth below.

TECHNICAL FIELD

The various embodiments of the present disclosure relate generally to sorbent fiber compositions. More particularly, various embodiments of the present disclosure are directed towards sorbent fibers for pressure swing and temperature swing adsorption processes.

BACKGROUND OF THE INVENTION

Adsorption processes are widely used in industry for separation of fluid mixtures. This separation is based on preferential sorption of selective components on the surface or within the cavities of sorbent materials. For most separation systems, the adsorbent material has a large surface area to provide reasonable adsorptive capacities. The commonly used adsorbents, such as molecular sieve zeolites, activated carbon, alumina, and silica gel, have surface areas of at least 200 $m^2/g$.

Many industrial adsorption processes are carried out in fixed-bed type columns. The adsorbent material (e.g., granules, particles) are generally packed and immobilized in a cylindrical vessel. As the fluid mixture designated for separation is passed through the packed column, the adsorbable components in the mixture are taken up and retained by the adsorbent as the adsorbate, and the non-adsorbable components pass through the column via the void spaces among the adsorbent granules.

Given that the adsorbent has a limited adsorption capacity, the adsorbent will gradually become saturated with adsorbate, and periodic adsorbent regeneration is required. For continuous processing of a feed fluid mixture, a multi-bed system is used in which each bed goes through the adsorption/regeneration cycle in sequence. Several different regeneration methods have been used commercially, including a pressure swing adsorption (PSA) process and a thermal swing adsorption (TSA) process. In the TSA process, the saturated adsorbent is regenerated by purging with a hot gas. Each heating/cooling cycle usually requires a few hours to over a day. In the PSA process, adsorbent regeneration is effected by purging with a portion of the purified product gas at reduced pressure. The throughput in PSA is generally higher than that of the TSA, since faster temporal cycles, usually in minutes, are possible.

Apart from the adsorptive capacity of the adsorbent, the adsorption rate and pressure drop are two important factors that must be considered in adsorbent column design. Pressure drop through the adsorbent column should be minimized, because high fluid pressure drop can cause movement or fluidization of the adsorbent particles, resulting in serious attrition and loss of the adsorbent. The adsorption rate has a significant bearing on the efficiency of the adsorption process. This rate is usually determined by the mass transfer resistance to adsorbate transport from the bulk fluid phase to the internal surfaces of the adsorbent particles. A slow adsorption rate, due to large mass transfer resistance, will result in a long mass transfer zone (MTZ) within which the adsorbent is only partially saturated with adsorbate. The adsorbent in the region upstream of the MTZ is substantially saturated with adsorbate, while that downstream of the MTZ is essentially free of adsorbate. As the fluid continues to flow, the MTZ advances through the adsorber column in the direction of the fluid stream. The adsorption step must be terminated before the MTZ reaches the adsorber outlet in order to avoid the breakthrough of adsorbate in the effluent stream. A long mass transfer zone, which contains a large quantity of partially utilized adsorbent, will, therefore, result in a short adsorption step and inefficient use of the adsorbent capacity.

Both the pressure drop and the mass transfer resistance are strongly influenced by the size of the adsorbent particles. Changing the particle size, unfortunately, has opposite effects on these two important factors. The interstitial space between the adsorbent particles in the fixed-bed is proportional to the size of the particles. Since the resistance to the fluid flow through the adsorber is inversely proportional to the pore size of the packed bed, the use of small adsorbent particles will cause a high pressure drop. For this reason, the sizes of particles of commercial adsorbents for fixed-bed operation are generally larger than 2 mm in average diameter.

In addition, almost all the surface areas of commercial adsorbents are located at the interior of the adsorbent particle. For adsorption to occur, the adsorbate needs to be transported from the external fluid phase to the interior surface of the particle. The transport rate is influenced by two mass transfer mechanisms in series: (a) interfacial mass transfer—diffusion through the fluid boundary layer surrounding the external surface of the adsorbent particle; and (b) intraparticle mass transfer—diffusion through the internal pore space (micropores and macropores) of the particle to its interior surface where adsorption takes place. The size of the particle has significant effects on the rates of these two diffusion processes. Small particles offer large fluid/solid contact areas in the fixed bed for interfacial mass transfer and reduce the path length for the intraparticle diffusion. Hence, small adsorbent particles will increase the adsorption rate and result in a narrow mass transfer zone for fast and efficient operation of adsorption/desorption cycles. Thus, small adsorbent particles are desirable for efficient adsorption processes, but the minimum particle size is limited by acceptable hydrodynamic operating conditions of the fixed bed adsorber. That is, one wants to avoid fluidization and excessive pressure drop.

Accordingly, there is a need for compositions and methods of adsorbing at least a component of a medium characterized by a relatively small particle size and yet still able to operate with an acceptable pressure drop. It is to the provision of such compositions and methods that the various embodiments of the present invention are directed.

SUMMARY

The various embodiments of the present disclosure relate generally to sorbent fiber compositions. More particularly, various embodiments of the present disclosure are directed towards sorbent fibers for pressure swing and temperature swing adsorption processes. Broadly described, an aspect of the present invention comprises a sorbent composition, comprising a fiber and a sorbent material. The sorbent material can have an average longest dimension of less than about 10 micrometers. The fiber can comprise a plurality of tortuous pathways.

Another aspect of the present invention comprises a sorbent composition, the composition comprising: a fiber comprising a plurality of tortuous pathways; and a sorbent material, wherein the sorbent material is in fluid communication with at least a portion of the plurality of tortuous pathways. The fiber can further comprise a polymer matrix. The plurality of tortuous pathways can comprise one or more of a micropore, a mesopore or a macropore, wherein the one or more of a micropore, a mesopore or a macropore are in fluid communication.

The sorbent material can have an average longest dimension of less than about 10 micrometers. The fiber can have an average longest cross-sectional dimension of at least about 100 micrometers. The sorbent material can comprise less than about 80% by weight of the fiber.

The fiber can further comprise a lumen disposed within the fiber. The lumen can have an average longest cross-sectional dimension of at least about 55 micrometers. The fiber can have an average longest cross-sectional dimension at least two times greater than that of the lumen.

The fiber can further comprise a barrier layer. The barrier layer functions to prevent fluid communication between the sorbent material and a heat transfer medium. The barrier layer can have an average thickness of less than about 50 micrometers.

An aspect of the present invention comprises a fiber-based adsorption contactor, the contactor comprising: a chamber itself comprising: a feed stream inlet; a feed stream outlet; a plurality of substantially aligned fibers, wherein each of the fibers comprises: a plurality of tortuous pathways wherein the tortuous pathways are in fluid communication with the feed stream inlet and the feed stream outlet; and a sorbent material, wherein the sorbent material is in fluid communication with at least a portion of the plurality of tortuous pathways. In an embodiment of the present invention, a lumen can be disposed within the fiber. This contactor can be used in a pressure swing adsorption process. The fiber-based adsorption contactor can further comprising a binder material effective to interconnect the longitudinal ends of adjacent fibers.

The chamber can further comprise a heat transfer fluid inlet and a heat transfer fluid outlet for flowing a heat transfer fluid, wherein the fiber is in fluid communication with the heat transfer fluid inlet and the heat transfer fluid outlet. A barrier layer can be associated with a surface of the fiber and can prevent fluid communication between the heat transfer fluid and the plurality of tortuous pathways in at least a substantial majority of the fibers. Such a contactor can be used in a temperature swing adsorption process.

A fiber-based adsorption contactor can be used for feed streams, including, but not limited to, a fuel, chemical, petrochemical, soil, flue gas, natural gas, fuel gas, bio gas, town gas, waste gas, water, coal gas, air, or a carbon dioxide-containing medium. The heat transfer medium is water, water vapor, steam, gas, or combinations thereof.

An aspect of the present invention comprises a method of adsorbing a component of a medium, the method comprising: contacting a medium with a fiber comprising a plurality of tortuous pathways, a plurality of sorbent elements in fluid communication with the plurality of tortuous pathways; and adsorbing a component of the medium. The method of adsorbing a component of a medium can further comprise desorbing the component of the medium. The method of adsorbing a component of a medium can further comprise preventing fluid communication between the medium and a heat exchange fluid. The method of adsorbing a component of a medium can further comprise repeating the contacting and adsorbing. The method of adsorbing a component of a medium can comprise a cycle time between successive adsorptions that is less than about 2 minutes.

The method of adsorbing a component of a medium can be used for medium, including, but not limited to, air, water, fuels, chemicals, petrochemicals, soil, flue gas, natural gas, fuel gas, bio gas, town gas, waste gas, water, coal gas, air, or a carbon dioxide-containing fluid.

Other aspects and features of embodiments of the present invention will become apparent to those of ordinary skill in the art, upon reviewing the following description of specific, exemplary embodiments of the present invention in conjunction with the accompanying figures.

DETAILED DESCRIPTION

Medium separation is important in various industries, including but not limited to, the production of fuels, chemicals, petrochemicals, and specialty products. The term "medium" is used herein for convenience and refers generally to many fluids, liquids, gases, solutions, suspensions, powders, gels, dispersions, slurries, emulsions, vapors, flowable materials, multiphase materials, or combinations thereof. A medium can comprise a feed stream. A medium can comprise a mixture of a plurality of components. The term "plurality" as used herein refers to more than one.

Medium separation can be accomplished by many methods that, assisted by heat, pressures, solids, fluids, or other means, generally exploit the differences in physical and/or chemical properties of the components to be separated. For example, gas separation can be achieved by partial liquefaction or by utilizing an adsorbent material that preferentially retains or adsorbs a more readily retained or adsorbed component relative to a less readily adsorbed component of the gas mixture.

One such method for separation of a medium includes pressure swing adsorption (PSA). PSA comprises a process, wherein a bed of adsorbent material is used to separate one or more components out of a stream of a medium under high pressure, and then the adsorbent bed is regenerated (releasing the adsorbed components) by decreasing the pressure of the bed. One feature of PSA is the relationship that exists between pressure, time, and the size of the adsorbent bed. In PSA, pressure drop is purposely minimized. Although the pressure within a bed changes substantially during a cycle, the pressures at various points in a bed at a given time are virtually the same.

Another commercially practiced gas separation process is temperature swing adsorption (TSA). TSA comprises a process wherein a bed of adsorbent material is used to separate one or more components out of a stream of a medium, and then the adsorbent bed is regenerated by increasing the temperature of the bed.

A PSA or TSA process can comprise preferential adsorption of at least one component of a medium by an adsorbent material relative to a second component or other components in the medium. The total amount of the at least one component adsorbed from the medium (i.e., the adsorption capacity of the adsorbent material) and the selectivity of the adsorption for one component over another component of the medium, can often be improved by operating the adsorption process under specific pressure and temperature conditions, as both pressure and temperature may influence the adsorption loading of a component of the medium.

One of the limitations of the PSA process is the difficulty associated with the use of the small adsorbent particles. Although, small adsorbent particles provide increased surface area for separation of a medium, small adsorbent particles are responsible for the substantial pressure gradients in the adsorbent bed. The use of larger particles in the same bed results in decreased separating ability—a high degree of separation cannot be maintained at the same productivity. Extending the bed in combination with the use of larger particles (to maintain the same overall flow resistance) also results in a deteriorating productivity and eventually in the inability to make high-purity product. The larger particles have larger intra-particle resistances, and these larger resistances may become a factor in bed performance with the fast cycle times used in pressure-swing parameter pumping. Using particles substantially smaller than about 40-80 mesh (177 μm to 420 μm) leads to too large a flow resistance, and productivity drops. Thus an optimal particle size exists, and in general this will lie in the range of 20-120 mesh (125 μm to 840 μm).

If one could decouple the macroscopic bed pore size properties from the particle size of the active adsorbent particles, engineering of a PSA or TSA process could occur more efficiently. One way to achieve this decoupling is to prepare monoliths with engineered porosity to suspend the active adsorbent particles. In this case, the open porous structure allows the free flow of fluids through the monolith to reach the micropores within particles where components they contain may be selectively adsorbed. By engineering the macroporosity in the monolith, the pressure drop within the bed can be adjusted for a given bed with particles having convenient sizes to enable a desired cycle time and almost any bed depth desired. While this is useful in principle, the drawback of this approach is that it introduces a serious third problem, since making large sized reproducible monoliths is difficult and expensive. Various embodiments of the present invention are directed to overcome the problems associated with preparation of monoliths as described in U.S. Patent Application Publication No. 2008/0011163.

Referring now to the figures, wherein like reference numerals represent like parts throughout the several views, exemplary embodiments of the present invention will be described in detail. Throughout this description, various components may be identified having specific values or parameters, however, these items are provided as exemplary embodiments. Indeed, the exemplary embodiments do not limit the various aspects and concepts of the present invention as many comparable parameters, sizes, ranges, and/or values may be implemented. By way of example, the term sorbent is intended to encompass both adsorption and absorption. While reference will be made throughout this disclosure to adsorption and associated compositions, materials, and processes, it should be recognized that absorption is also intended to be encompassed by the description, and vise-versa.

Figure 1A:
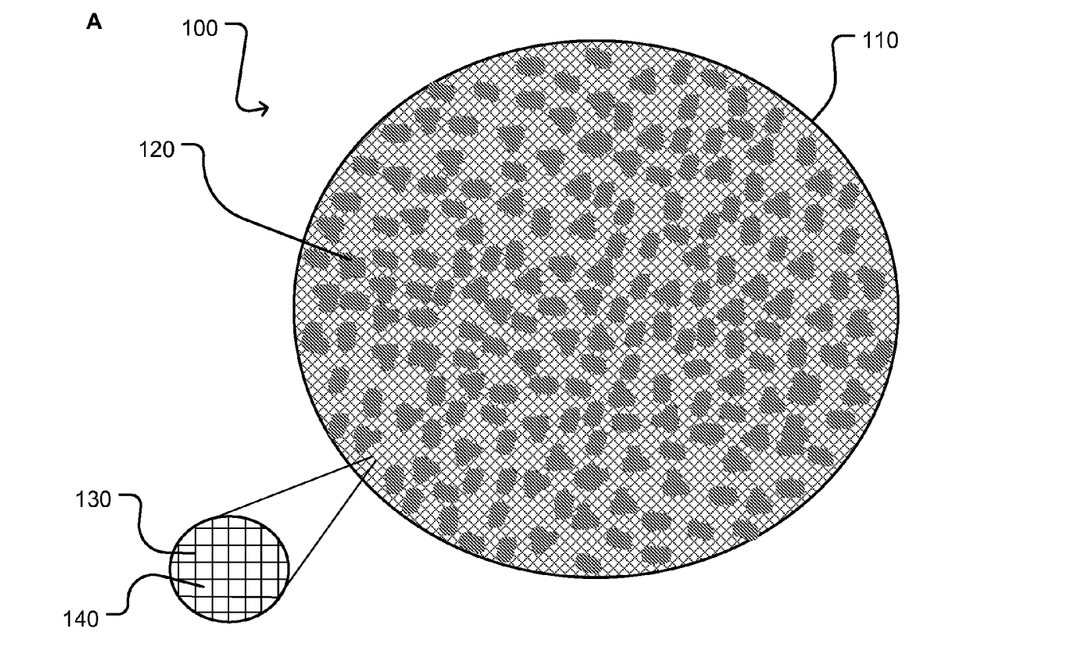
FIGS. 1A-D illustrate a fiber composition comprising an adsorbent material dispersed in the polymer matrix (A), with a lumen (B), with a barrier layer (C), and with a lumen and a barrier layer (D).

An aspect of the present invention comprises a sorbent composition 100, comprising a fiber 110, which itself comprises at least one adsorbent material (and, by extension as described above, at least one absorbent material) (See, FIG. 1A). In an embodiment of the present invention, a fiber 110 can comprise a polymer network 130, the polymer network 130 comprising a plurality of tortuous pathways 140. A fiber 110 comprises many classes of materials that are continuous, flexible, filaments or are in discrete elongated pieces, similar to lengths of thread. As used herein, a "fiber" means a continuous, flexible, filamentous material having a relatively high aspect ratio (i.e., ratio of length to average longest cross-section). In an embodiment of the present invention, an aspect ratio can be at least about 4:1. In an embodiment of the present invention, an aspect ratio can be at least about 10:1, at least about 100:1, or at least about 1000:1.

A fiber 110 can have many cross-sectional shapes, including, but not limited to, a rectangular shape, a circular shape, a semicircular shape, a square shape, a pentagonal shape, a triangular shape, a hexagonal shape, an octagonal shape, a star shape, a starburst shape, a "U" shape, a lobed shape, a multi-lobed shape, an arbitrary shape, or combinations thereof or therebetween. One of ordinary skill in the art would realize that the cross-sectional shape of the fiber 110 will determine the average longest cross-sectional dimension of the fiber. For example, the average longest cross-sectional dimension of a fiber having a circular cross-sectional shape will be the diameter of the fiber. In an alternative example, the average longest cross-sectional dimension of a fiber having a rectangular cross-sectional shape will be the length (with the proviso that the so-called length is greater than the so-called width) of the rectangular cross-section of the fiber. In yet another example, the average longest cross-sectional dimension of a fiber having a starburst cross-sectional shape will be the distance between the two furthest points of the starburst cross-section of the fiber.

In an embodiment of the present invention, a fiber 110 has an average longest cross-sectional dimension of at least about 100 micrometers, or at least about 500 micrometers, or at least about 1000 micrometers, or at least about 2000 micrometers. In an embodiment of the present invention, a fiber 110 has an average longest cross-sectional dimension of about 1200 micrometers. In an exemplary embodiment of the present invention, a fiber, having a circular cross-section, has an average diameter of about 1200 micrometers. Fibers can comprise diameters ranging from about 800 to about 1500 micrometers.

A fiber 110 comprises at least one adsorbent material 120. In an embodiment of the present invention, a fiber can comprise a plurality of adsorbent materials, including at least one adsorbent material or at least two adsorbent materials or more. Various embodiments of the present invention make use of at least one adsorbent material 120 to selectively adsorb at least one component of a medium. An adsorbent material can comprise molecular sieves, zeolites, silico-aluminophosphate (SAPO) materials, aluminosilicates, aluminophosphate (ALPO) materials, activated carbon, activated alumina, silicates, amine-grafted silica, metal-organic framework materials, covalent organic framework materials, metal-organic polyhedra, zeolite-imidazolate framework materials, polymer-based adsorbents, chemical functional groups, or combinations thereof, among others.

The at least one component of a medium can comprise many materials, including but not limited to, carbon dioxide, hydrogen, nitrogen, oxygen, boron, arsenic, salt, water, minerals, or other impurities. A medium can comprise many media, including but not limited to air, water, fuels, chemicals, petrochemicals, soil, flue gas, natural gas, fuel gas, bio gas, town gas, waste gas, coal gas, or a carbon dioxide-containing fluid. In an exemplary embodiment of the present invention, an adsorbent fiber composition can be used to capture of $CO_2$ from flue gas. In another exemplary embodiment of the present invention, an adsorbent fiber composition can be used to capture of $CO_2$ from air. In yet another exemplary embodiment of the present invention, an adsorbent fiber composition can be used to capture of impurities (e.g., boron, arsenic, salt, minerals, among others) from water. In an embodiment of the present invention, $H_2$ can be separated from $H_2S$, $CO_2$, or $CH_4$.

In an embodiment of the present invention, an adsorbent material can be used to selectively adsorb $CO_2$ from a medium. For example, to capture $CO_2$, a flue gas feed stream is contacted with an adsorbent material having a selectivity of greater than about 5 for adsorbing $CO_2$ over nitrogen in the flue gas mixture, or greater than about 10 for adsorbing $CO_2$ over nitrogen in the flue gas mixture. In an embodiment of the present invention, an adsorbent material can have a selectivity for carbon dioxide over nitrogen of about 10 to about 60. Selectivity, as used herein, is defined as the ratio of the ratio of the spatially averaged concentrations of $CO_2$ and nitrogen in the adsorbent material (used to remove $CO_2$ and nitrogen from a flue gas at the end of the adsorption process) to the spatially averaged concentration of $CO_2$ and nitrogen in the flue gas in contact with the sorbent. One of ordinary skill in the art would realize that similar selectivities may be desired for the adsorption of other components of a medium.

Unless otherwise noted, the term selectivity as used herein is based on binary (e.g., pairwise) comparison of the molar concentration of components in a feed stream medium and the total number of moles of these components adsorbed by the particular adsorbent during the adsorption step of the process under the specific system operating conditions and feedstream composition. For a medium containing component A, component B, as well as additional components, an adsorbent that has a greater selectivity for component A than component B will have at the end of the adsorption step of the swing adsorption process cycle a ratio:

$$U_A = \frac{\text{(total moles of } A \text{ in the adsorbent)}}{\text{(molar concentration of } A \text{ in the flue gas in contact with the sorbent)}}$$

that is greater than the ratio:

$$U_B = \frac{\text{(total moles of } B \text{ in the adsorbent)}}{\text{(molar concentration of } B \text{ in the flue gas in contact with the sorbent)}}$$

where $U_A$ is the "Adsorption Uptake of component A" and $U_B$ is the "Adsorption Uptake of component B." Therefore, an adsorbent having a selectivity for component A over component B that is greater than one is represented by:

Selectivity=$U_A/U_B$ (where $U_A>U_B$).

Amongst a comparison of different components in the feed stream medium, the component with the smallest ratio of the total moles picked up in the adsorbent to its molar concentration in the feed is the "lightest component" in the swing adsorption process. It is not necessary that the lightest component have the lowest molecular weight; however, in the case of $CO_2$ and $N_2$, the "lightest" compound in the sense used here is $N_2$. This means that the molar concentration of the lightest component in the stream coming out during the adsorption step is greater than the molar concentration of that lightest component in the feed. In an embodiment of the present invention, an adsorbent compositions can have a selectivity for a first component (e.g., component A) over a second component (e.g., component B) of at least 5, a selectivity for a first component over a second component of at least 10, or a selectivity for a first component over a second component of at least 25.

In an embodiment of the present invention, the loading of $CO_2$ in an adsorbent material can be greater than about 0.25 millimole of $CO_2$ per gram of adsorbent material, greater than about 0.75 millimole of $CO_2$ per gram of adsorbent material, or greater than greater than about 1.5 millimole of $CO_2$ per gram of adsorbent material. In an embodiment of the present invention, an adsorbent material can comprise a heat of sorption of about −25 kJ/(mol $CO_2$) to about −90 kJ/(mol $CO_2$). Examples of adsorbent materials that can selectively remove $CO_2$ from a medium include, but are not limited to, microporous materials such as zeolites, cationic zeolites, ALPO materials, and SAPO materials. Non-limiting examples of zeolites suitable for use herein include zeolite 4A, 5A, Bx, NaX, and NaY. Non-limiting examples of cationic zeolites include zeolites with Si/Al ratios less than about 5, such as faujasite, Beta, and mordenite. Siliceous zeolites such as MFI can also be used to remove $CO_2$ from nitrogen-containing mixtures. Additional adsorbent materials can comprise hydrotalcite, microporous materials comprising a framework of elements other than Si or Al (such as P), carbon, microporous sol-gel derived materials, silicas, and amines grafted to mesoporous silica, among others. These adsorbent materials can be used alone or in combination with other materials.

Adsorbent materials that can adsorb SOx, NOx, and water include, but are not limited to, zeolites, cationic zeolites, mesoporous materials, carbons, polymers, mixed matrix materials, and combinations thereof.

In an embodiment of the preset invention, an adsorbent material can comprise about less than 80% by weight of the dry phase of the fiber, or about less than 75% by weight of the dry phase of the fiber, or about less than 70% by weight of the dry phase of the fiber. In an exemplary embodiment of the present invention, the adsorbent material comprises about 65% by weight of the dry phase of the fiber.

In an embodiment of the present invention, a fiber 110 can comprise at least one adsorbent material 120. An adsorbent material 120 can comprise an adsorbent layer, an adsorbent particle, an adsorbent entity, a plurality of adsorbent particles, or a plurality of adsorbent entities, among others. In an embodiment of the present invention, an adsorbent material 120 can have an average longest dimension of less than about 100 micrometers. In an embodiment of the present invention, an adsorbent material can have an average longest dimension of less than about 50 micrometers. In an exemplary embodiment of the present invention, an adsorbent material can have an average longest dimension of less than about 10 micrometers. In an embodiment of the present invention, an adsorbent material can have an average longest dimension of less than about 2 micrometers.

In an embodiment of the present invention, a sorbent composition 100 can comprise a fiber 110 comprising a polymer matrix 130 and a plurality tortuous pathways 140 through the fiber. The plurality of tortuous pathways 140 can comprise a plurality of pores, wherein at least a portion of the pores are in fluid communication with one another. In an embodiment of the present invention, the plurality of tortuous pathways 140 can comprise one or more of mesopores, macropores, or micropores, wherein at least a portion of the one or more of mesopores, macropores, or micropores are in fluid communication with one another. In an embodiment of the present invention, the adsorbent material 120 is associated with the polymer matrix 130. According to various embodiments of the present invention, the plurality adsorbent particles need not be highly bonded to the polymer matrix. In an embodiment of the present invention, the relationship between the adsorbent material and the polymer matrix can be described as a "sieve in a cage." In an exemplary embodiment of the present invention, a fiber can comprise a plurality of adsorbent particles in fluid communication with at least a portion of the plurality of tortuous pathways. Although embodiments of the present invention disclose the dispersion of a plurality of adsorbent particles throughout the fiber, some of the tortuous pathways do not have adsorbent particles associated with them.

The fibers 110 comprising a plurality of tortuous pathways permit decoupling of the adsorption kinetics from the pressurization-depressurization dynamics within an adsorptive system to achieve improved separation performance. This decoupling enables the use of longer beds and the production of compact high capacity processes.

A fiber 110 comprising a polymer network 130 can be made of many polymers, including but not limited to, a cellulose acetate, polyvinylpyrrolidone, polysulfone, epichlorohydrin, a polyether amide block co-polymer, polyimides, polyolefins, polypropylene, polyethylene, polyamides, poly (tetrafluoroethene), polyvinylidene chloride (PVDC), polystyrene, polyisobutylene, polybutadiene, polyurethanes, elastomers, co-polymers thereof, or combinations thereof. A fiber 110 can comprise a glass or ceramic material. A fiber 110 can comprise a combination of a polymer and a glass or ceramic material as well.

Figure 1B:
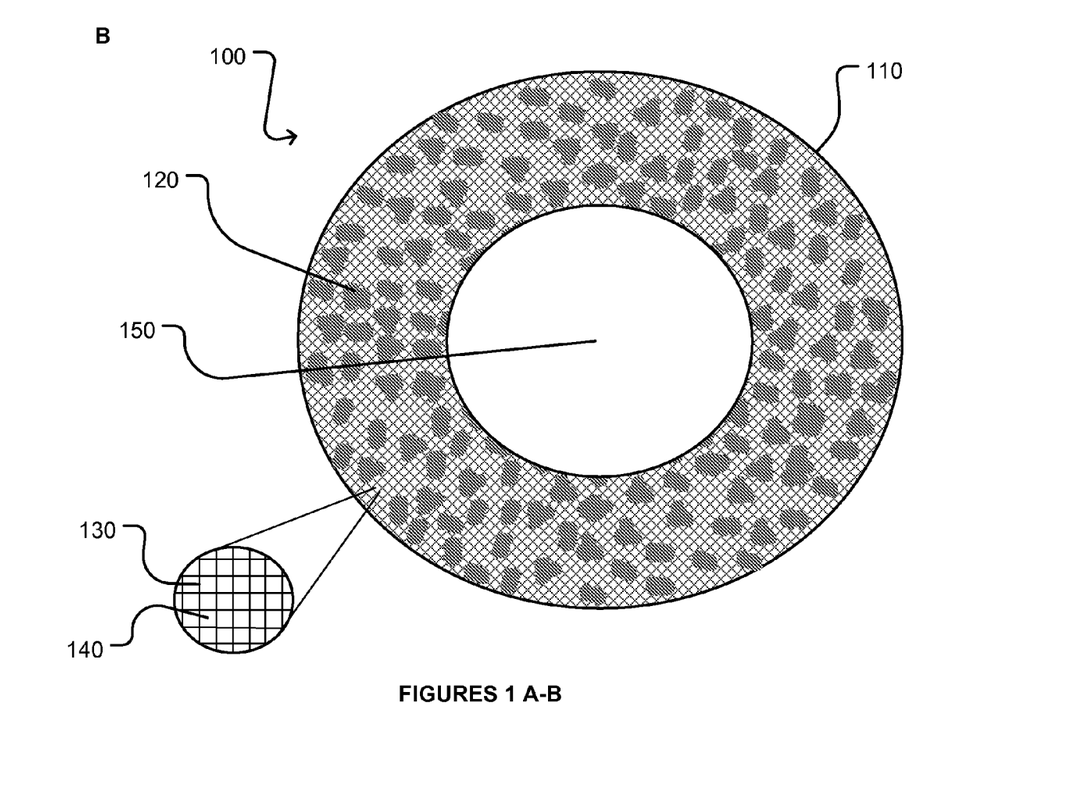
Figure 1C:
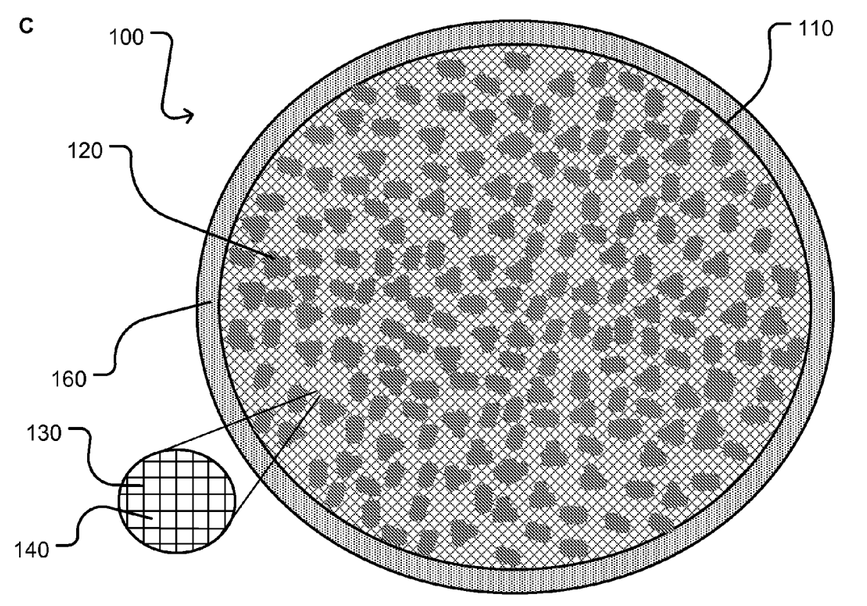
Figure 1D:
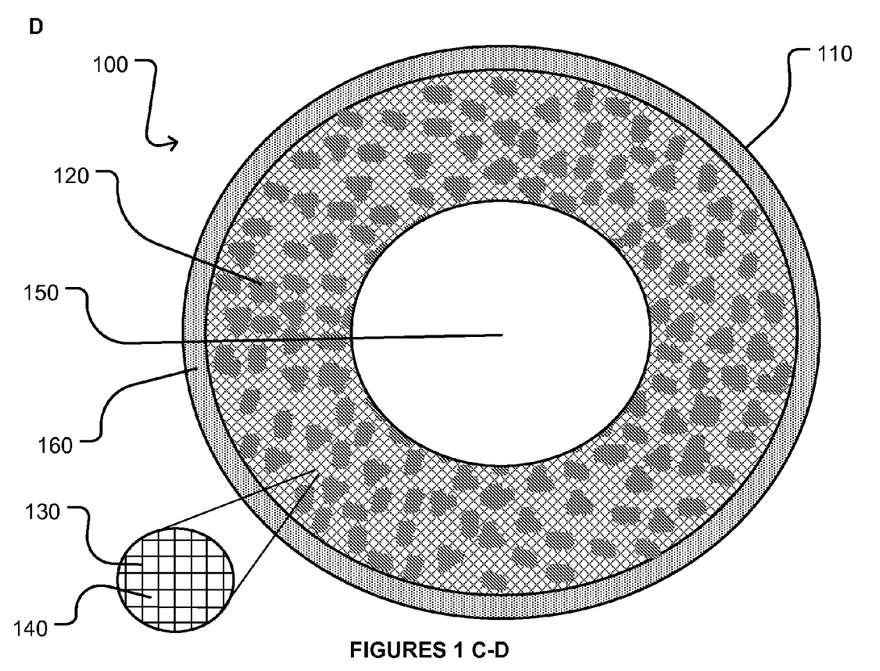

A fiber 110 can further comprise a lumen 150 disposed within a fiber 110. (See, FIGS. 1B and 1D). A lumen 150 can have many cross-sectional shapes, including, but not limited to, a rectangular shape, a circular shape, a semicircular shape, a square shape, a pentagonal shape, a triangular shape, a hexagonal shape, an octagonal shape, a star-shape, a starburst shape, a "U" shape, a lobed shape, a multi-lobed shape, an arbitrary shape, or combinations thereof or therebetween. One of ordinary skill in the art would realize that the cross-sectional shape of the lumen 150 will determine the average longest cross-sectional dimension of the lumen. For example, the average longest cross-sectional dimension of a lumen having a circular cross-sectional shape will be the diameter of the lumen. In an alternative example, the average longest cross-sectional dimension of a lumen having a rectangular cross-sectional shape will be the length of the lumen. In yet another example, the average longest cross-sectional dimension of a lumen having a starburst cross-sectional shape will be the distance between the two furthest points of the starburst cross-section of the lumen.

In an embodiment of the present invention, a lumen 150 has an average longest cross-sectional dimension of at least about 50 micrometers, or at least about 200 micrometers, or at least about 500 micrometers, or at least about 1000 micrometers. In an embodiment of the present invention, a lumen 150 has an average longest cross-sectional dimension of about 300 micrometers. In an exemplary embodiment of the present invention, a lumen, having a circular cross-section, has an average diameter of about 300 micrometers. Lumens can comprise diameters ranging from about 200 to about 500 micrometers.

In an embodiment of the present invention, a fiber 110 can have the same or similar cross-sectional shape as its lumen 150. In an embodiment of the present invention, a fiber 110 can have a different cross sectional shape as compared to its lumen 150. In an embodiment of the present invention, the ratio of the average longest cross-sectional dimension of fiber to the average longest cross-sectional dimension of the lumen is greater than about 2:1, or greater than about 4:1. In an exemplary embodiment of the present invention, the ratio of the average longest cross-sectional dimension of fiber to the average longest cross-sectional dimension of the lumen is about 4:1.

The additional structural option offered by a lumen 150 enables further engineering of the axial pressure drop shown in the bed. With the presence of a lumen, axial fluid flow will occur through the lumen 150 rather than flow within the tortuous pathways 140. In this case, radial distribution can occur easily through the tortuous pathways with a small pressure drop as a medium migrates to access the sorbent material within at least a portion of the tortuous pathways 140.

A fiber 110 can further comprise a core disposed within the lumen. The core can be made of many materials that can structurally support the fiber 110, including, but not limited to, an elastomer, a porous material, a polymer, or combinations thereof. For example, the core can comprise a porous material capable of "snubbing" shock waves during pressurization.

In an embodiment of the present invention, a sorbent composition 100 can further comprise a fiber 110 having a barrier layer 160 to prevent fluid communication between the plurality of tortuous pathways 140 and a heat transfer medium. (See, FIGS. 1C and 1D). The bather layer 160 can comprise many materials, including but not limited to polyvinylidene chloride (PVDC), polyacrylonitrile, epichlorohydrin (Hydrin), polyether amide block co-polymer, glass, silica, alumina, metal, metal oxides, latex, other high barrier polymers, co-polymers thereof, or combinations thereof. In an embodiment of the present invention, the barrier layer 160 has an average thickness of less than about 50 micrometers. In an embodiment of the present invention, the barrier layer 160 has an average thickness of less than about 30 micrometers An aspect of the present invention comprises a method of adsorbing a component of a medium. The method can comprise: contacting a medium with a fiber comprising a plurality of tortuous pathways and a sorbent material in fluid communication with at least a portion of the plurality of tortuous pathways; and adsorbing a component of the medium. The method can further comprise desorbing a component of the medium.

Various methods of the present invention are directed to adsorbing a medium, wherein the medium can comprise many media, including but not limited to air, water, fuels, chemicals, petrochemicals, flue gas, natural gas, fuel gas, bio gas, town gas, waste gas, water, coal gas, air, or a carbon dioxide-containing fluid. The at least one component of a medium can comprise many materials, including but limited to, carbon dioxide, hydrogen, nitrogen, oxygen, boron, arsenic, salt, water, minerals, or other impurities.

The methods of the present invention make use of a fiber-based adsorption contactor (See FIGS. 2A-B), the contactor comprising, a chamber, which itself, comprises: a feed stream inlet; a feed stream outlet; a plurality of substantially aligned fibers, wherein each of the fibers comprises: a plurality of tortuous pathways wherein the tortuous pathways are in fluid communication with the feed stream inlet and the feed stream outlet; and a sorbent material, wherein the sorbent material is in fluid communication with at least a portion of the plurality of tortuous pathways. The methods of the present invention can comprise a plurality of contactors.

Figure 2A:
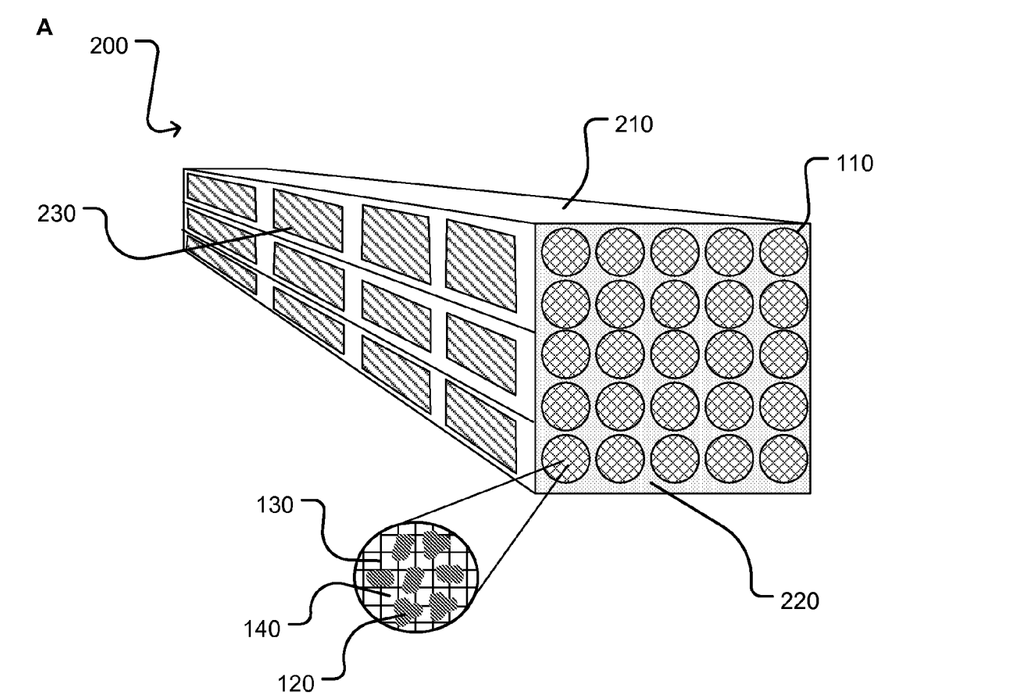
FIGS. 2A-B provide schematics of a perspective view of a cross flow contactor comprising a chamber (A) and a transparent chamber (B).
Figure 2B:
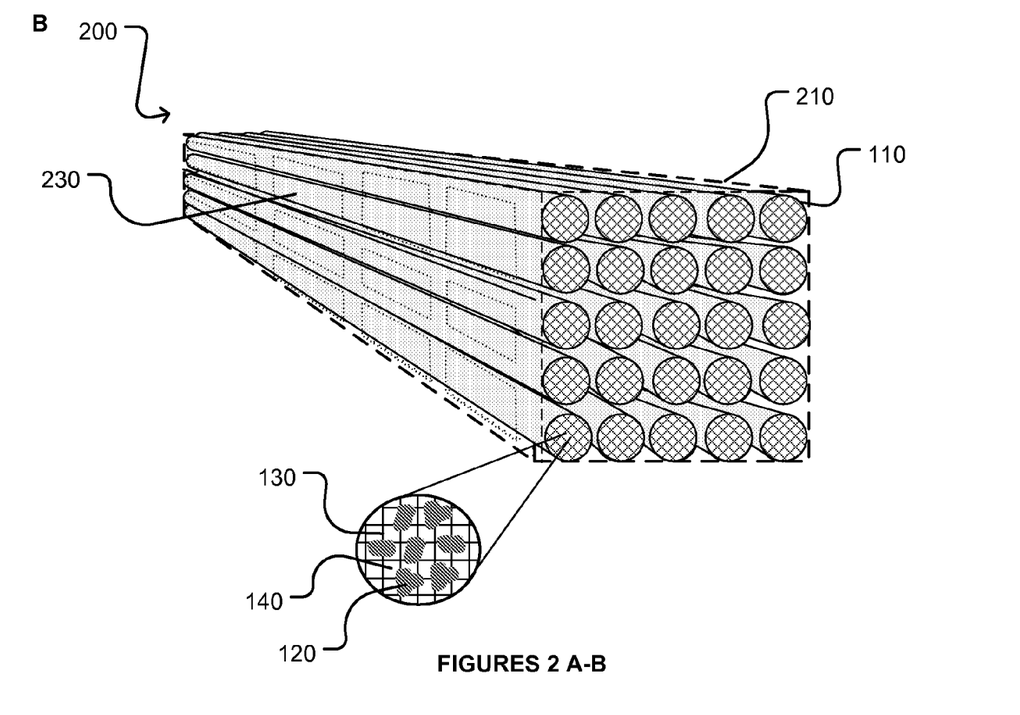

FIGS. 2A-B provide schematic representations of ways in which structured hollow fiber adsorbents can be formed into a cross flow contactor. A cross flow contactor 200 comprising fiber adsorbents 110 is shown in FIGS. 2A and 2B. FIG. 2B shows the contactor of FIG. 2A with the outer surfaces of the chamber 210 of the contactor rendered transparent. In FIG. 2B, dotted lines indicate the edges of the outer surface of the chamber 210 of the contactor. A fiber 110 comprises a polymer matrix 130 comprising at least one adsorbent material 120 and a plurality of tortuous pathways 140.

A plurality of substantially aligned fibers 110 can be arranged in a bundle or splayed. The ends of the fibers can be potted or embedded in a binding material 220. In an embodiment of the present invention, more than the ends of the fiber (e.g., any or all of the fiber) can be potted or embedded in a binding material 220. The binding material 220 effectively interconnects adjacent fibers. A binding material 220 can comprise an epoxy or a resin, among others. In an embodiment of the present invention, the binding material 220 fixes the fibers 110 into a substantially parallel array. One method to do this is with an embedding or potting process that surrounds the ends of the fibers with a binding material 220. To visualize the potted fiber array, FIG. 2 B shows the substantially parallel channel fiber contactor with the binding material 220 rendered transparent along with chamber 215. For RPSA contactors, interstitial space between sorbent fibers can also be filled with epoxy or a flexible shock absorbing medium to provide high strength and resilience against cyclic pressurization in operation. The potted array is then sealed into a chamber 210. Sealing surfaces may be provided at the ends of the chamber 210. Although the chamber 210 is illustrated as a rectangular or cube shape, the chamber can have many shapes including but not limited to a tubular or cylindrical chamber. Windows 230 can be cut through the wall of the chamber 210 to allow a medium to pass into the contactor for cross flow applications. In an alternative embodiment, a medium can be flowed down the longitudinal axis of a fiber.

The fiber 110 can further comprises a lumen 150 (not pictured) disposed within the fiber 110 and a barrier layer 160 (not pictured) to prevent fluid communication between the plurality of tortuous pathways 140 and a heat transfer medium. Since the barrier layer 160 prevents fluid communication between the plurality of tortuous pathways 140 and a heat transfer medium, the heat transfer medium can be flowed in the interstitial spaces between the fibers 110. To act as a diffusion barrier, the effective diffusion coefficient of the barrier layer 160 should be less than about $1/50$ the average diffusion coefficient in the polymer matrix 130 and preferably less than about $1/10,000$ the average diffusion coefficient in the polymer matrix 130. The barrier layer effectively excludes heating and cooling fluids fed in the interstitial spaces of the plurality of fibers from entering the polymer matrix 130 or the loss of sorbate material, such as $CO_2$, into the lumen fluids.

In an embodiment of the present invention, a central gas collection tube can be located in the center of the contactor. The end of the central gas collection tube of the gas collection tube can be made of a solid impermeable material, which can include, but is not limited to, a solid metal or engineering plastic. This allows gas to enter or exit the contactor 200 without mixing with the heating or cooling fluids. The portion of the gas collection tube inside the module is a porous material, such as porous metal or a porous polymer or a woven mesh, among others. This allows gas within the contactor to be efficiently collected.

In various embodiments of the present invention, the contactor 200 can be designed to provide efficient contacting of the medium with the at least one adsorbent material that selectively removes at least one component from the medium. Efficient contacting minimizes the amount of adsorbent required, volume of the contactor, and energy required to regenerate the contactor. With an efficiently designed contactor, the pressure drop of a medium, and fluids used to heat or cool the contactor is also minimized. This, in turn, minimizes energy lost from pressure drop of a medium flowing through the contactor and the energy required to pump or compress the fluids used to heat or cool the contactor.

In an embodiment of the present invention, a fiber-based adsorption contactor is cycled through at least two steps: an adsorption step and a regeneration step. Regeneration of the contactor in a TSA process is achieved by heating the contactor to an effective temperature that will result in desorbing the captured component from the contactor. The contactor is then cooled so that another adsorption step can be completed. Regeneration of the contactor in a PSA process is achieved by flowing a medium at an effectively low pressure that will result in desorbing the captured component from the contactor.

Various embodiments of the present invention are directed towards cyclically exposing a plurality of fiber-based adsorption contactors to a heat transfer medium to facilitate adsorption and desorption in a TSA process. The heat transfer medium can comprise many media, including, but not limited to, water, water vapor, steam, or combinations thereof. In an exemplary embodiment of the present invention, water is flowed through the interstitial spaces of the plurality of fibers 110 of a fiber-based adsorption contactor 200 for adsorption, and steam is flowed through the interstitial spaces of the plurality of fibers 110 of a fiber-based adsorption contactor 200 for desorption.

Various embodiments of the present invention are directed towards cyclically exposing a plurality of fiber-based adsorption contactors to a high pressure and low pressure medium feed stream to facilitate adsorption and desorption, respectively, in a PSA process.

One of skill in the art would realize that eventually, the adsorption material of a fiber-based adsorption contactor (e.g., the first contactor) approaches saturation, and an adsorption front breaks through the contactor, resulting in the amount of a desired component being removed from the medium falling below a desired value. Consequently, the flow of medium to the first contactor can be diverted into a second contactor, which has already been regenerated, while the first contactor is regenerated. Following regeneration, the first contactor is prepared for the adsorption process, and the flow of the medium is switched back from the second contactor to the first contactor. The total cycle time is the length of time from when the medium is initially conducted to the first contactor in a first cycle to the time when the medium is again conducted to the first contactor in the immediately succeeding cycle, i.e., after a single regeneration of the bed. The use of a plurality of contactors (i.e., third, fourth, fifth, etc.) in addition to a first and second contactor can provide continuous processing, especially in instances when adsorption time is shorter than regeneration time.

In an exemplary embodiment, the swing adsorption process comprises rapid cycles of adsorption and desorption, in which case the process can be referred to as a rapid cycle thermal swing adsorption (RCTSA) process or a rapid pressure swing adsorption process (RPSA). A RCTSA or RPSA process, for purposes of this disclosure, is defined as one in which the cycle time between successive adsorption steps is less than about 2 minutes, or less than about 1 minute, or less than about 15 seconds, or less than 10 seconds. In certain situations, the cycle time between successive adsorption steps can be low as 5 seconds, and even as low as 1 to 2 seconds. In an embodiment of the present invention, the regeneration step can be assisted with a partial pressure purge displacement, or a pressure swing, among others. These combinations of processes are referred to herein as thermal swing processes as long as they employ a thermal swing at some point during the regeneration step.

In many cases, the time required for adsorbent regeneration may be shorter than the time required for the contactor's adsorption capacity to be fully utilized. In such cases, it may be desirable to have a plurality of contactors in the adsorbing phase while a plurality of contactors are in the regeneration phase. In an embodiment of the present invention, a plurality of contactors engaged in adsorption are connected in serial fashion, such that the most-recently regenerated contactor unit is the last bed in line for adsorption, and the first unit in line will be next to be regenerated. In another embodiment, the adsorbing units are connected in parallel, such that each adsorber treats a portion of the whole feed.

The compositions, methods, and apparatus used in the practice of the present invention that are designed for the capture of components from a medium can be quite efficient. In some instances, a component can be captured from a medium in an amount greater than about 50%, greater than about 75%, greater than about 85%, or greater than about 95% of the component by the adsorbent material. One of ordinary skill in the art would realize that embodiments of the methods of the present invention can involve the capture of less than about 50% of a component from a medium.

In an embodiment of the present invention, adsorbent compositions and methods can comprise the separation of one or more components from a medium. In an embodiment of the present invention, one or more components can be removed from a medium by contacting a medium to a contactor comprising one or more adsorbent materials. In an embodiment of the present invention, a contactor can comprise a plurality of fibers, a fiber comprising a mixture of at least one adsorbent material capable of adsorbing different components of a medium. In an embodiment of the present invention, a contactor can comprise a plurality of fibers, a first fiber comprising a first adsorbent material capable of adsorbing a first component of a medium, and a second fiber comprising a second adsorbent material capable of adsorbing a second component of the medium. The use of a plurality of fibers (i.e., third, fourth, fifth, etc.) in addition to a first and second fiber can further provide adsorption of multiple components of a medium.

In an embodiment of the present invention, one or more components of a medium can be adsorbed by using one or more contactors. In an embodiment of the present invention, a medium can be passed through a first contactor to remove one component of a medium, and a second contactor to remove another component of the medium (i.e., separate units of operation (e.g., contactors) for each component of the medium). When multiple components are removed from a medium (e.g., flue gas) with one or more contactors, a contactor can be optimized for the removal of a particular component.

In an embodiment of the present invention, one or more contactor can comprise a first contactor to remove water and a second contactor to remove one or more of SOx, NOx, and $CO_2$ from flue gas. In an embodiment of the present invention, one or more contactor can comprise a first contactor to remove water and a second contactor to remove organics. One or more contactors can be used because the various embodiments of the present invention disclose methods for regenerating each contactor upon completion of the adsorption step.

In an embodiment of the present invention, a plurality of different adsorbent materials can be used to form a contactor. In such embodiments, an adsorbent material can be selected for the desired removal of a particular component of the medium. A contactor comprising a plurality of adsorbent materials permits the selective removal of a plurality of components with a single contactor. In another embodiment of the present invention, a contactor can comprise an adsorbent material capable of removing a plurality of components from a medium.

An aspect of the present invention comprises a system for the removal of a first component and a second component from a medium. The system can comprise a contactor comprising a plurality of adsorbent materials, which are independently capable of adsorbing a first component and a second component. In an exemplary embodiment of the present invention, the selective adsorbent for the first component can be located in proximity to the feed stream inlet and the selective adsorbent for the second component can be located downstream from the selective adsorbent for the first component. Such a configuration is designed to first remove the first component from the medium followed by the removal of the second component. In some embodiments, the same adsorbent material that is used to remove first component can also remove and other components of the medium.

In an embodiment of the present invention, a dehydration process can comprise glycol dehydration, which can be used to remove water from a medium. In such embodiments, the medium can be dehydrated in a separate process or unit operation prior to introduction of the medium to the adsorbent contactor. For example, to efficiently remove water with glycol dehydration from a flue gas, the temperature of the flue gas can be reduced to less than about 110° C., or less than about 75° C.

In another embodiment of the present invention, a dehydration process can comprise a physical knockout of condensed water (e.g., such as drops or a mist) prior to contacting the medium with an adsorbent contactor. In such embodiments, the contactor can comprise an adsorbent material that selectively removes water from the medium. Adsorbents capable of selectively removing water from a medium include, but are not limited to, cationic zeolites, functionalized microporous and mesoporous materials, carbons, mixed matrix materials, polymers, or combinations thereof.

In various embodiments of the present invention, the processed medium exiting the adsorption contactor can be dehydrated to below about 400 ppm, or below about 50 ppm, or below about 20 ppm water content during at least one point during the adsorption cycle.

When a contactor removes a significant fraction (e.g., greater than about 75%) of a first component and a second component from a medium, an embodiment of the present invention can comprise a regeneration process designed to remove both of these components. In an embodiment of the present invention, the regeneration process can be conducted so that a separate first component stream and a separate second component stream are produced during the regeneration process.

In an embodiment of the present invention, adsorption and regeneration of a TSA contactor is accomplished by externally cooling and heating the contactor, respectively. Externally heated contactors comprise the interstitial space between fibers to flow a heat transfer medium (e.g., a fluid, liquid, gas) to heat and cool the contactor. In an exemplary embodiment of the present invention, the interstitial spaces are not in fluid communication with the adsorbent material, so that the heat transfer medium does not mix with the feed stream or component(s) liberated during the regeneration step.

It must be noted that, as used in this specification and the appended claims, the singular forms "a", "an", and "the" include plural referents unless the context clearly dictates otherwise.

All patents, patent applications, and references included herein are specifically incorporated by reference in their entireties.

It should be understood, of course, that the foregoing relates only to exemplary embodiments of the present invention and that numerous modifications or alterations may be made therein without departing from the spirit and the scope of the invention as set forth in this disclosure.

Although the exemplary embodiments of the present invention are provided herein, the present invention is not limited to these embodiments. There are numerous modifications or alterations that may suggest themselves to those skilled in the art.

The present invention is further illustrated by way of the examples contained herein, which are provided for clarity of understanding. The exemplary embodiments should not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

Therefore, while embodiments of this invention have been described in detail with particular reference to exemplary embodiments, those skilled in the art will understand that variations and modifications can be effected within the scope of the invention as defined in the appended claims. Accordingly, the scope of the various embodiments of the present invention should not be limited to the above discussed embodiments, and should only be defined by the following claims and all equivalents.

What is claimed is:

1. A sorbent composition, the composition comprising: a fiber comprising a plurality of tortuous pathways; and a sorbent material, wherein the sorbent material is in fluid communication with at least a portion of the plurality of tortuous pathways, the fiber further comprises a polymer matrix, and the sorbent material is associated with the polymer matrix.

2. The sorbent composition of claim 1, wherein the plurality of tortuous pathways comprise one or more of a micropore, a mesopore or a macropore, wherein the one or more of a micropore, a mesopore or a macropore are in fluid communication.

3. The sorbent composition of claim 1, wherein the sorbent material has an average longest dimension of less than about 10 micrometers.

4. The sorbent composition of claim 1, wherein the fiber has an average longest cross-sectional dimension of at least about 100 micrometers.

5. The sorbent composition of claim 1, wherein the sorbent material comprises less than about 80% by weight of the fiber.

6. The sorbent composition of claim 1, wherein the fiber further comprises a lumen disposed within the fiber.

7. The sorbent composition of claim 6, wherein the lumen has an average longest cross-sectional dimension of at least about 55 micrometers.

8. The sorbent composition of claim 1, wherein the fiber further comprises a barrier layer, wherein the barrier layer prevents fluid communication between the sorbent material and a heat transfer medium.

9. A fiber-based adsorption contactor, the contactor comprising: a chamber comprising: a feed stream inlet; a feed stream outlet; a plurality of substantially aligned fibers, wherein each of the fibers comprises: a plurality of tortuous pathways wherein the tortuous pathways are in fluid communication with the feed stream inlet and the feed stream outlet; and a sorbent material, wherein the sorbent material is in fluid communication with at least a portion of the plurality of tortuous pathways.

10. The fiber-based adsorption contactor of claim 9, wherein a lumen is disposed within the fiber.

11. The fiber-based adsorption contactor of claim 10, wherein the contactor is used in a pressure swing adsorption process.

12. The fiber-based adsorption contactor of claim 9, the chamber further comprising a heat transfer fluid inlet and a heat transfer fluid outlet for flowing a heat transfer fluid, wherein the fiber is in fluid communication with the heat transfer fluid inlet and the heat transfer fluid outlet.

13. The fiber-based adsorption contactor of claim 12, wherein a barrier layer is associated with a surface of the fiber and prevents fluid communication between the heat transfer fluid and the plurality of tortuous pathways in at least a substantial majority of the fibers.

14. The fiber-based adsorption contactor of claim 9, wherein a feed stream is a fuel, chemical, petrochemical, soil, flue gas, natural gas, fuel gas, bio gas, town gas, waste gas, water, coal gas, air, or a carbon dioxide-containing medium.

15. The fiber-based adsorption module of claim 12, wherein the heat transfer medium is water, water vapor, steam, gas, or combinations thereof.

16. A method of adsorbing a component of a medium, the method comprising: contacting a medium with a fiber comprising a plurality of tortuous pathways, a plurality of sorbent elements in fluid communication with the plurality of tortuous pathways; and adsorbing a component of the medium.

17. The method of adsorbing a component of a medium of claim 16, further comprising desorbing the component of the medium.

18. The method of adsorbing a component of a medium of claim 16, wherein the medium comprises air, water, fuels, chemicals, petrochemicals, soil, flue gas, natural gas, fuel gas, bio gas, town gas, waste gas, water, coal gas, air, or a carbon dioxide-containing fluid.

19. The method of adsorbing a component of a medium of claim 16, further comprising preventing fluid communication between the medium and a heat exchange fluid.

20. The method of adsorbing a component of a medium of claim 16, further comprising repeating the contacting and adsorbing.

21. The method of adsorbing a component of a medium of claim 20, wherein a cycle time between successive adsorptions is less than about 2 minutes.

* * * * *